United States Patent
Marrow et al.

(10) Patent No.: US 10,601,617 B1
(45) Date of Patent: *Mar. 24, 2020

(54) POSITION ERROR SIGNAL BURST DEMODULATION

(71) Applicant: Seagate Technology LLC, Cupertino, CA (US)

(72) Inventors: Marcus Marrow, San Jose, CA (US); Jason Vincent Bellorado, San Jose, CA (US); Trung Thuc Nguyen, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,944

(22) Filed: May 8, 2018

Related U.S. Application Data

(63) Continuation of application No. 15/390,447, filed on Dec. 23, 2016, now Pat. No. 9,979,573.

(51) Int. Cl.
| | |
|---|---|
| *G11B 21/02* | (2006.01) |
| *H04L 27/06* | (2006.01) |
| *H04L 27/22* | (2006.01) |

(52) U.S. Cl.
CPC .............. *H04L 27/06* (2013.01); *H04L 27/22* (2013.01)

(58) Field of Classification Search
CPC ........ H04L 27/06; H04L 1/0016; H04L 27/22
See application file for complete search history.

(56) References Cited

U.S. PATENT DOCUMENTS

| | | | |
|---|---|---|---|
| 5,369,345 A | 11/1994 | Phan et al. |
| 5,563,746 A | 10/1996 | Bliss |
| 5,726,818 A | 3/1998 | Reed et al. |
| 5,754,352 A | 5/1998 | Behrens et al. |
| 5,793,548 A | 8/1998 | Zook |
| 5,822,142 A | 10/1998 | Hicken |
| 5,909,332 A | 6/1999 | Spurbeck et al. |
| 5,954,837 A | 9/1999 | Kim |
| 6,069,758 A | 5/2000 | Chung |
| 6,172,836 B1 | 1/2001 | Bang |
| 6,275,346 B1 | 8/2001 | Kim et al. |
| 6,307,696 B1 | 10/2001 | Bishop et al. |
| 6,353,649 B1 | 3/2002 | Bockleman et al. |

(Continued)

*Primary Examiner* — Dac V Ha
(74) *Attorney, Agent, or Firm* — Setter Roche LLP; Christian W. Best

(57) ABSTRACT

A method may generate a demodulated sine component for a sequence of samples of a servo burst window of a position error signal using a sine weight look up table and generate a demodulated cosine component for the sequence of samples of the servo burst window of the position error signal using a cosine weight look up table. The sine weight and the cosine weight look up tables may have indexes representing a phase range. The method may generate a demodulated phase component signal and a demodulated amplitude component signal for the sequence of samples of the servo burst window of the position error signal based on the demodulated sine component and the demodulated cosine component using a Coordinate Rotation Digital Computer at least in part by iteratively rotating a vector based on the demodulated sine component and the demodulated cosine component and summing angular changes in the vector.

18 Claims, 10 Drawing Sheets

(56) References Cited

U.S. PATENT DOCUMENTS

| | | |
|---|---|---|
| 6,480,349 B1 | 11/2002 | Kim et al. |
| 6,590,733 B1 * | 7/2003 | Wilson ............... G11B 5/5921 360/77.14 |
| 6,594,094 B2 | 7/2003 | Rae et al. |
| 6,594,098 B1 | 7/2003 | Sutardja |
| 6,760,185 B1 | 7/2004 | Roth et al. |
| 6,973,150 B1 | 12/2005 | Thuringer |
| 6,996,193 B2 | 2/2006 | Yamagata et al. |
| 7,035,029 B2 | 4/2006 | Sawada et al. |
| 7,068,461 B1 | 6/2006 | Chue et al. |
| 7,199,956 B1 | 4/2007 | Moser et al. |
| 7,602,568 B1 | 10/2009 | Katchmart |
| 7,619,841 B1 * | 11/2009 | Kupferman .......... G11B 5/5582 360/27 |
| 7,643,548 B2 | 1/2010 | Hafeez |
| 7,665,007 B2 | 2/2010 | Yang et al. |
| 7,738,538 B1 | 6/2010 | Tung |
| 7,916,422 B1 * | 3/2011 | Guo ................. G11B 5/59688 360/76 |
| 7,917,563 B1 | 3/2011 | Shih et al. |
| 7,995,691 B2 | 8/2011 | Yang |
| 7,997,582 B2 | 8/2011 | Wong |
| 8,077,571 B1 | 12/2011 | Xia et al. |
| 8,139,305 B2 | 3/2012 | Mathew et al. |
| 8,266,505 B2 | 9/2012 | Liu et al. |
| 8,400,726 B1 | 3/2013 | Wu et al. |
| 8,516,347 B1 | 8/2013 | Li et al. |
| 8,625,216 B2 | 1/2014 | Zhang et al. |
| 9,043,688 B1 | 5/2015 | Chan et al. |
| 9,077,501 B1 | 7/2015 | Oberg et al. |
| 9,129,646 B2 | 9/2015 | Mathew et al. |
| 9,178,625 B1 | 11/2015 | Hueda et al. |
| 9,236,952 B2 | 1/2016 | Sun et al. |
| 9,362,933 B1 | 6/2016 | Chaichanavong |
| 9,613,652 B2 | 4/2017 | Link et al. |
| 2002/0094048 A1 | 7/2002 | Simmons et al. |
| 2003/0026016 A1 | 2/2003 | Heydari et al. |
| 2003/0048562 A1 | 3/2003 | Heydari et al. |
| 2003/0185291 A1 | 10/2003 | Nakahira et al. |
| 2004/0047403 A1 | 3/2004 | Choi et al. |
| 2006/0279873 A1 * | 12/2006 | Bandic ............... G11B 5/59688 360/78.04 |
| 2007/0002890 A1 | 1/2007 | Mangold et al. |
| 2007/0018733 A1 | 1/2007 | Wang et al. |
| 2007/0205833 A1 | 9/2007 | Mar et al. |
| 2008/0292029 A1 | 11/2008 | Koslov |
| 2009/0268857 A1 | 10/2009 | Chen et al. |
| 2010/0138722 A1 | 6/2010 | Harley et al. |
| 2010/0211830 A1 | 8/2010 | Sankaranarayanan et al. |
| 2010/0272150 A1 | 10/2010 | Kil et al. |
| 2011/0072330 A1 | 3/2011 | Kolze |
| 2011/0158359 A1 | 6/2011 | Khayrallah et al. |
| 2013/0182347 A1 | 7/2013 | Maeto |
| 2013/0339827 A1 | 12/2013 | Han et al. |
| 2014/0268397 A1 * | 9/2014 | Zhang ................ G11B 20/1217 360/48 |
| 2014/0337676 A1 | 11/2014 | Yen et al. |
| 2014/0355147 A1 | 12/2014 | Cideciyan et al. |
| 2015/0124912 A1 | 5/2015 | Eliaz et al. |
| 2015/0179213 A1 | 6/2015 | Liao et al. |
| 2015/0189574 A1 | 7/2015 | Ng et al. |
| 2016/0055882 A1 | 2/2016 | Cideciyan et al. |
| 2016/0134449 A1 | 5/2016 | Liu et al. |
| 2016/0156493 A1 | 6/2016 | Bae et al. |
| 2016/0270058 A1 | 9/2016 | Furuskog et al. |
| 2017/0162224 A1 | 6/2017 | Mathew et al. |

\* cited by examiner

| Clock/sample # | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 4T Sin | 0 | 1 | 0 | -1 | 0 | 1 | 0 | -1 | 0 | 1 | 0 | -1 | 0 | 1 | 0 | -1 |
| 4T Cos | 1 | 0 | -1 | 0 | 1 | 0 | -1 | 0 | 1 | 0 | -1 | 0 | 1 | 0 | -1 | 0 |
| 8T Sin | 0 | b | 1 | b | 0 | -b | -1 | -b | 0 | b | 1 | b | 0 | -b | -1 | -b |
| 8T Cos | 1 | b | 0 | -b | -1 | -b | 0 | b | 1 | b | 0 | -b | -1 | -b | 0 | b |
| 16T Sin | 0 | a | b | c | 1 | c | b | a | 0 | -a | -b | -c | -1 | -c | -b | -a |
| 16T Cos | 1 | c | b | a | 0 | -a | -b | -c | -1 | -c | -b | -a | 0 | a | b | c |

$$a = \sin\left(\frac{\pi}{8}\right) = \frac{1}{2}\sqrt{2-\sqrt{2}},\ b = \sin\left(\frac{2\pi}{8}\right) = \frac{1}{\sqrt{2}},\ c = \sin\left(\frac{3\pi}{8}\right) = \frac{1}{2}\sqrt{2+\sqrt{2}}$$

FIG. 5

US 10,601,617 B1

POSITION ERROR SIGNAL BURST DEMODULATION

CROSS-REFERENCE TO RELATED APPLICATIONS

This application is a continuation of and claims priority to co-pending U.S. patent application Ser. No. 15/390,447, entitled "POSITION ERROR SIGNAL BURST DEMODULATION", which was filed Dec. 23, 2016, the contents of which is incorporated herein by reference in its entirety.

SUMMARY

In certain embodiments, an apparatus may include a circuit configured to generate a demodulated phase component signal and a demodulated amplitude component signal based on a servo burst window of a position error signal using a CORDIC (COordinate Rotation DIgital Computer).

In certain embodiments, a position error signal burst demodulation system may include a sine demodulation circuit configured to generate a demodulated sine component using a sine weight look up table and a cosine demodulation circuit configured to generate a demodulated cosine component using a cosine weight look up table.

In certain embodiments, a method may generate a demodulated sine component for a sequence of samples of a servo burst window of a position error signal using a sine weight look up table and generate a demodulated cosine component for the sequence of samples of the servo burst window of the position error signal using a cosine weight look up table. In some examples, the sine weight look up table and the cosine weight look up table may have indexes representing a phase range. The method may then generate a demodulated phase component signal and a demodulated amplitude component signal for the sequence of samples of the servo burst window of the position error signal based on the demodulated sine component and the demodulated cosine component using a CORDIC (COordinate Rotation DIgital Computer) at least in part by iteratively rotating a vector based on the demodulated sine component and the demodulated cosine component and summing angular changes in the vector.

BRIEF DESCRIPTION OF THE DRAWINGS

FIG. 5 is an illustration of a look up table that may include sine and cosine weights, in accordance with certain embodiments of the present disclosure;

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

Systems that move robotic arms from one position to another may need to do that as quickly as possible and maintain an accurate positioning over the destination. An example of such a system is a mass storage device. In particular, disc drives can move a transducer with an actuator assembly from an initial position (a track) to a target position (track). The move may be known as a seek. The seek function and the function of maintaining the positioning regarding the target track may be performed using position information that is obtained, for example, as the transducer is moved from the initial track to the target track and while over the target track.

The position information may be included the tracks. Knowing position information may allow the seek to be controlled so that the transducer can repeatedly settle quickly on the target track and allow the system to maintain that position.

Figure 1:
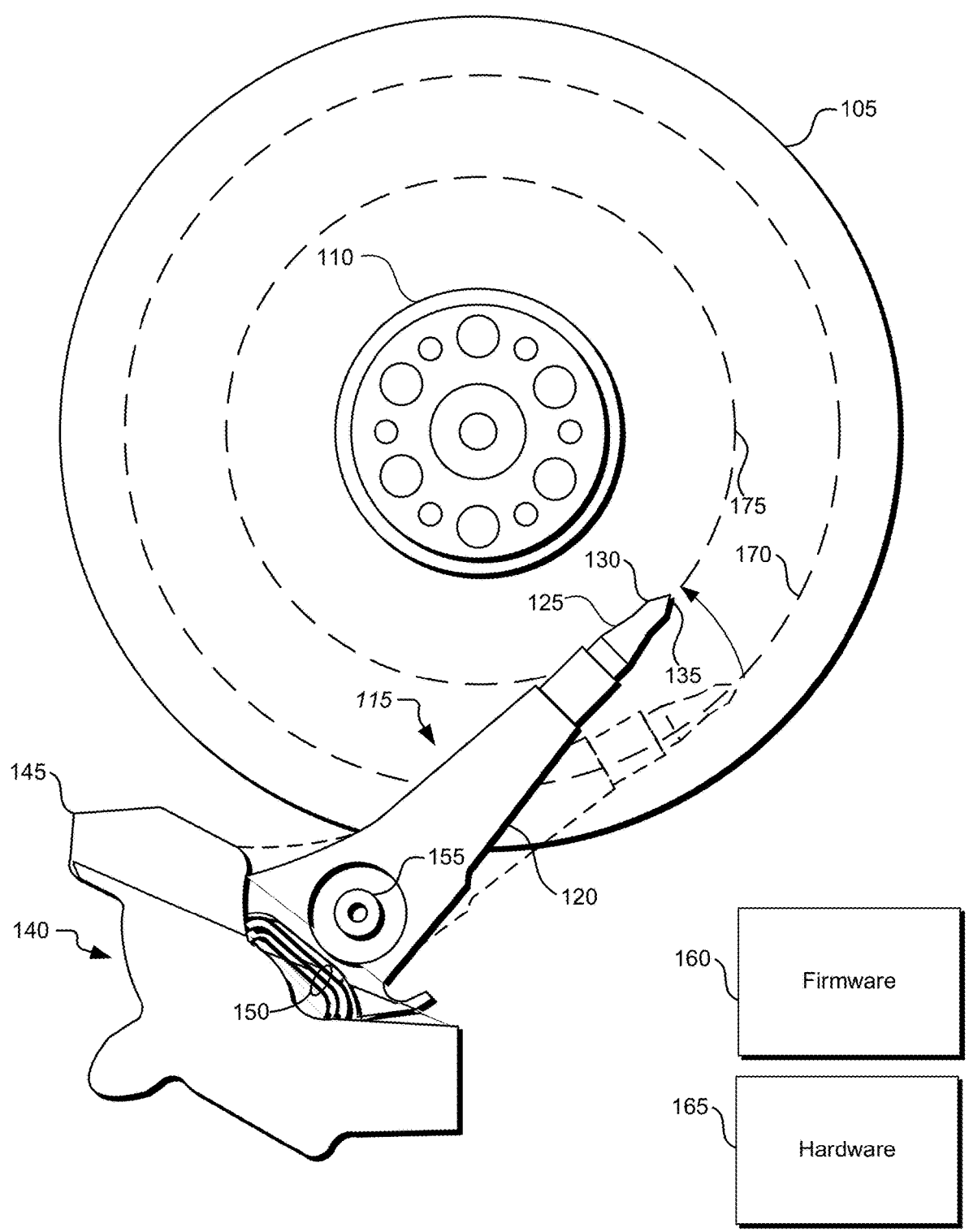
FIG. 1 is a block diagram of a system that uses PES burst demodulation, in accordance with certain embodiments of the present disclosure.

More detail will be provided with reference to FIG. 1 that shows a system 100 that may be embodied as a hard disc drive. System 100 includes a magnetic medium 105 that may be mounted to a spindle motor (not shown) by disc clamp 110. System 100 may also include an actuator assembly 115 that may include an actuator arm 120 and a flexure 125. At an end 130 may be a head gimbal assembly that may include the read/write transducer (not shown). A tab 135 may be used to support actuator assembly 115 on a ramp (not shown). System 100 may also include a voice coil motor (VCM) 140 that may include magnets (not shown) under a housing 145. VCM 140 may also include coils 150 that may be attached to actuator assembly 115. Current through coils 150 may create a magnetic field that may interact with the field of the VCM magnets to move actuator assembly 115 about pivot 155.

System 100 may also include firmware block 160 and hardware block 165 that may interact to determine the position of the system transducer, for example, with respect to the magnetic medium 105. Firmware block 160 may also include other functions of system 100. For example, in a hard disc drive, firmware block may provide functions such as buffer management, servo and spindle motor control, error detection and correction, background tasks such as disc scanning, defect management and other functions that may be used by a hard disc drive. Hardware block 160 may be electronic circuits that execute the functions of firmware block 160. Hardware block 160 may also provide additional functions not part of firmware block 160.

Actuator assembly 115 may be positioned so that the transducer is track-following track 170. Actuator assembly 115 may then be commanded to access an address on track 175. In this case, actuator assembly 115 may seek to track 175. When the transducer is within a threshold distance of the target track 175, the actuator assembly may settle on track 175 to then start track following. When the desired address on track 175 is within operational distance of the transducer, data saved at the address can be accessed (e.g., read or written).

Figure 2:
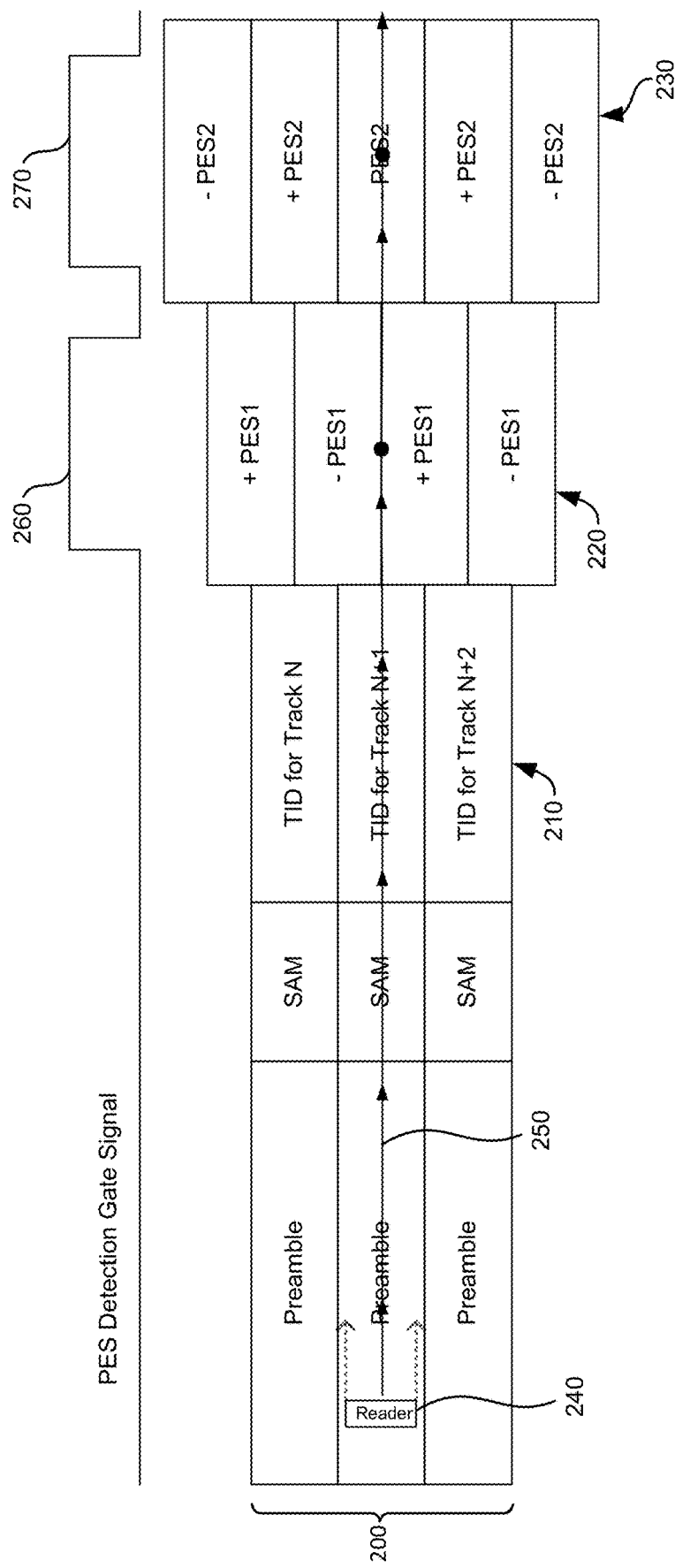
FIG. 2 is a layout of a "Null" patterned servo sector, in accordance with certain embodiments of the present disclosure.

The position information discussed previously may be contained in tracks of magnetic medium 105 (like 170, 175) to assist actuator assembly 115 in performing a seek and in track following. To illustrate, FIG. 2 shows three tracks 200 that each have associated exemplary position information, which includes track IDs (TIDs) 210 and position error signal fields (PES1, PES2) 220, 230. Along with a shown sector address mark (SAM), TID 210, PES1 220 and PES2 230 may be part of servo information for respective tracks. A shown preamble can also be included as part of the servo information. Servo information may be located circumferentially on a track. Thus, each track may contain multiple TIDs and PES.

TIDs 210 may be unique track identification numbers for each track, and may be used for coarse position information. PES1 220 and PES2 230 are servo burst signals that may be used for fine position information. FIG. 2 shows PES1 220 and PES2 230 in a null pattern. The PES fields are depicted as being written in a quadrature fashion with respect to the radius of the magnetic medium although this is not required. As the reader 240 of the transducer and the magnetic medium move relative to each other, reader 240 may read TIDs 210 and PES1 220 and PES2 230 to control the position of the transducer relative to the surface of the magnetic medium. For example, reader 240 may read TID for Track N+1, and then PES1 and PES2 to keep the transducer following track N+1 along centerline 250. TIDs 210 and PES1 220 and PES2 230 may also be used for track seeks. The position detection circuitry may be included in the servo function of the system. Position detection circuitry can include timing circuits and a preamplifier.

Position detection circuitry (either hardware 165 or a combination of hardware 165 and firmware 160 in FIG. 1) uses PES detection gate signals 260, 270 to time the detection of PES1 220 and PES2 230. More particularly, as the reader reads from the magnetic medium, the position error signal may be sampled as samples of a continuous time signal. The position error signal samples may be digitized and demodulated to produce demodulated sine, cosine phase and magnitude components. These demodulated components may then be used to perform servo control. In the example servo system depicted in FIG. 2, known as a null servo, the reader head may be radially positioned half-way between two PES bursts of opposite polarity, denoted +PES and −PES. In the illustrated example, the readback signal may have zero amplitude as the reader may produce a signal proportional to the average of the magnetization under the reader head. If the reader were radially moved a half-track up or down, the readback signal may have maximum amplitude. In this manner, the detected Track ID (TID), in combination with the magnitude of the readback signal, may be used to determine the reader's radial position. If the PES bursts are written with the correct phase relative to the preamble, which may drive phase of the sampling clock, the sine component of the demodulated signal may also be used to determine the head position. In some examples, the sine component may be robust to common noise sources such as Magneto-Resistive Asymmetry (MR).

Figure 3:
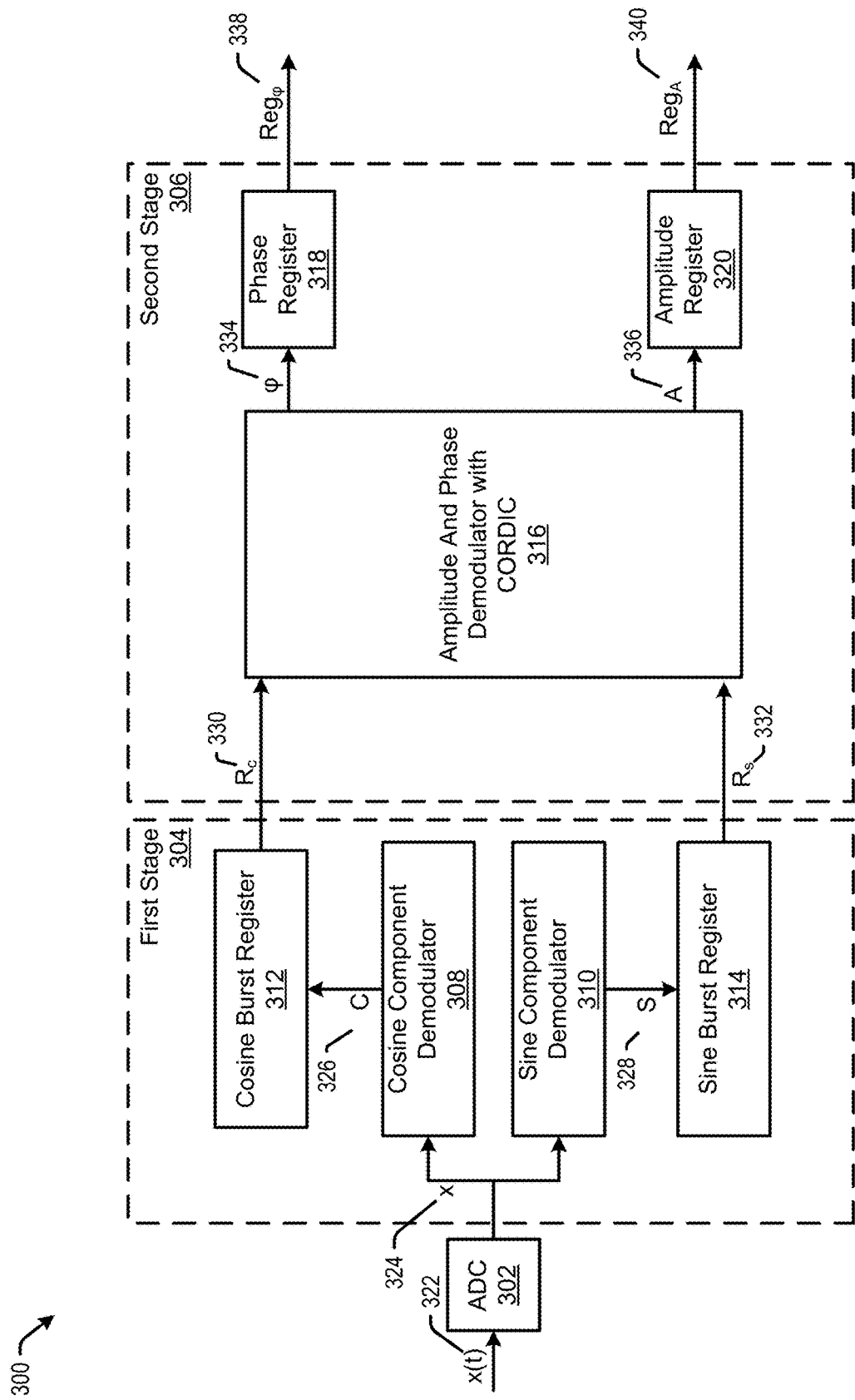
FIG. 3 is a block diagram of a system that uses PES burst demodulation, in accordance with certain embodiments of the present disclosure.

Referring to FIG. 3, a block diagram of a system of position error signal burst demodulation is shown and is generally designated 300. System 300 can include an analog-to-digital converter (ADC) 302 and a two stage PES burst demodulator including a first stage 304 and a second stage 306. The first stage 304 may include a cosine component demodulator 308, a sine component demodulator 310 that may each be coupled to or receive input from the ADC 302. The cosine component demodulator 308 and the sine component demodulator 310 may also be coupled to a cosine burst register 312 and a sine burst register 314, respectively. The outputs of the cosine burst register 312 and the sine burst register 314 may be coupled to the second stage 306. More particularly, the second stage 306 may include an amplitude and phase demodulator with a CORDIC (COordinate Rotation DIgital Computer) 316 (also referred to herein as module 316) and the inputs to module 316 may receive the outputs of the cosine burst register 312 and the sine burst register 314. The module 316 may further be coupled to a phase register 318 and an amplitude register 320.

Each of the ADC 302, the cosine component demodulator 308, the sine component demodulator 310, the cosine burst register 312 and the sine burst register 314, module 316, the phase register 318 and the amplitude register 320 may be a separate circuit, a system on chip (SOC), firmware, a processor(s), or other system not listed, or any combination thereof.

In operation, the ADC 302 may sample a continuous-time signal x(t) 322 at regular intervals and may quantize the signal to produce a digitized sequence of samples (x) 324. As discussed above, the samples of the continuous-time signal x(t) 322 may be based on position error signal information read from one or more tracks written on a magnetic medium.

The first stage 304 may operate to generate demodulated sine and cosine components from the digitized sequence of samples 324. In particular, the cosine component demodulator 308 and the sine component demodulator 310 may each receive the digitized sequence of samples 324 and generate a demodulated cosine value (C) 326 and a demodulated sine value (S) 328, respectively. The demodulated cosine value 326 and the demodulated sine value 328 may then be stored by the cosine burst register 312 and the sine burst register 314 and may be output to the second stage as register values $R_c$ 330 and $R_s$ 332. Details of an example embodiment of the first stage 304 are provided below with regard to FIGS. 4 and 5.

The second stage 306 may operate to generate demodulated phase and amplitude components using the demodulated cosine value and the demodulated sine value (received as values 330 and 332). The demodulated phase value (φ) 334 and the demodulated amplitude value (A) 336 may then be stored by the phase register 318 and the amplitude register 320, respectively, and may be output as register values $R_\varphi$ 338 and $R_A$ 340. Details of an example embodiment of the second stage 306 are provided below with regard to FIGS. 6, 7 and 8.

The cosine burst register 312, sine burst register 314, phase register 318 and the amplitude register 320 may output the register values $R_c$ 330, $R_s$ 332, $R_\varphi$ 338 and $R_A$ 340 to a servo system for use in controlling the servo.

Some embodiments of a position error signal burst demodulator according to this disclosure may support variable PES burst lengths, provide phase control as well as phase control adaptation to assist in preamble to burst phase offset calibration, and may support various burst rates (e.g. full-rate, half-rate, quarter-rate, eight-rate bursts). An example of such an embodiment is shown and described with regard to FIGS. 4-10.

Figure 4:
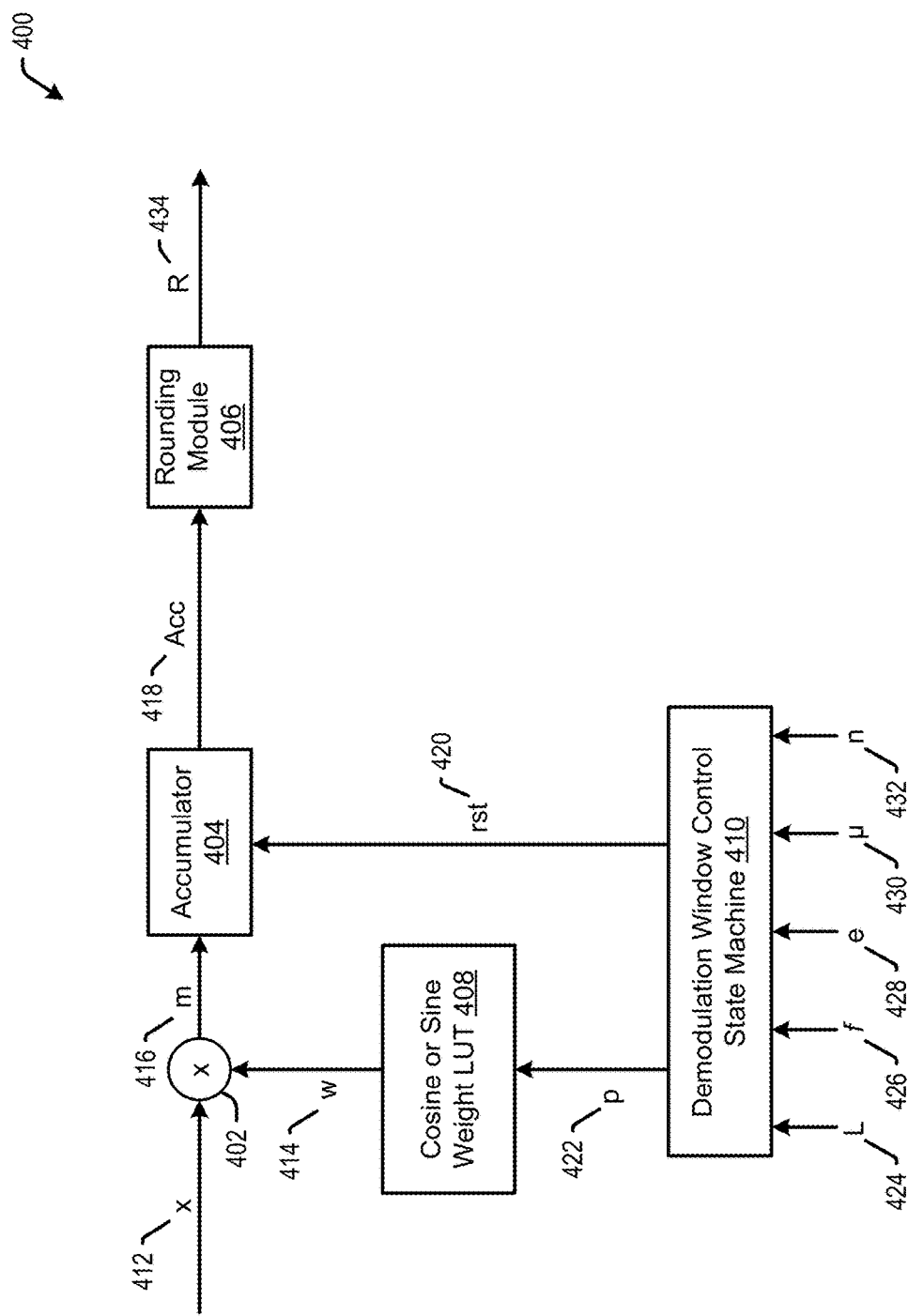
FIG. 4 is a block diagram of a portion of the architecture of a PES burst demodulator, in accordance with certain embodiments of the present disclosure.

Referring to FIG. 4, a block diagram of a portion of the architecture of a position error signal burst demodulator is shown and is generally designated 400. More particularly, the portion of the architecture of the position error signal demodulator shown may correspond to an example embodiment of the cosine component demodulator 308 or the sine component demodulator 310 of FIG. 3. As illustrated, the cosine or sine component demodulator may include a multiplier 402 that may be coupled to an accumulator 404 that may be coupled to a rounding module 406. The cosine or sine component demodulator may further include a cosine or sine weight look-up-table (LUT) 408 that may be coupled to the multiplier 402. In particular, the cosine component demodulator 308 may include a cosine weight LUT and the sine component demodulator 310 may further include a sine weight LUT. Below, the cosine or sine weight LUT 408 may be referred to as weight LUT 408. Additionally, the cosine or sine component demodulator may include a demodulation window control state machine 410 that may be coupled to the weight LUT 408 and the accumulator 404.

In operation, the sine or cosine component demodulator may compute the demodulated sine and cosine components as a direct weighted sums of the ADC samples under the demodulation window. The multiplier 402 may operate to multiply a sample 412, for example, of the digitized sequence of samples 324 and a weight 414 output by the weight LUT 408 and output the result (m) 416 to the accumulator 404. The accumulator 404 may operate to accumulate one or more results 416 from the multiplier 402 and output the result (Acc) 418 to the rounding module 406. The accumulator 404 may reset the accumulated value based on a control signal (rst) 420 output by the demodulation window control state machine 410.

The weight LUTs 408 may be look up tables including approximated values representing sampled sine and cosine waveforms of desired frequencies, phases and lengths. FIG. 5 is an illustration of a table 500 that may include ideal sine and cosine weights for the reference phase (e.g. no phase offset applied to the weights) for various clock or sample numbers and for various burst frequencies or rates (e.g. 4 T, 8 T and 16 T). The constant values included in the table 500 (e.g. a, b, c, d) may be defined by the equations indicated at 502. In operation, the weights included in the weight LUTs 408 may be approximations of these values. For example, the weights may be 8-bit approximations to these values and the weight LUTs 408 may be implemented using an 8-bit unsigned format. The index of the weight LUTs may represent phases. For example, an 8-bit weight LUT index may represent the phases, $2*\pi*[0, 1/256, 2/256, 3/256, \ldots, 255/256]$. The outputs for the sine and cosine weight LUTs with an 8-bit phase index input may be described by the following code fragment.

```
# define PI 3.14159265359
phase_radians=2.0*PI*phase_index/256.0;
sin_lut[phase_index]=(int)   rint(sin(phase_radians)*
255.0);
cos_lut[phase_index]=(int)   rint(cos(phase_radians)*
255.0);
```

The phase_index variable included in the code fragment above may correspond to the phase index (p) 422 received by the weight LUTs 408 from the demodulation window control state machine 410.

The demodulation window control state machine 410 may control or provide inputs to the other modules of the sine or cosine component demodulator to apply sine and cosine weights to the digitized samples from the ADC and accumulate the results over the demodulation window. As mentioned above, the demodulation window control state machine 410 may output the phase index (p) to the weight LUT 408 for generating weights for multiplier 402. The demodulation window control state machine 410 may further output a reset control signal (rst) 420 to the accumulator 404 to, for example, trigger the output of the accumulated result (Acc) 418 to the rounding module 406 at the end of the demodulation window and reset the accumulated value to zero (0) for the next demodulation window. The demodulation window control state machine 410 may determine the phase index 422 and the demodulation window size (e.g. a number of accumulation operations) based on a burst length (L) 424, a burst frequency (f) 426 and a phase offset ((p).

The following code fragment illustrates an example embodiment of the operation of the sine and cosine component demodulators 308 and 310 in which the demodulators includes a 8-bit phase index:

```
increment=256>>(BURST_FREQ+2);
C_accum=S_accum=0;
for (ii=0; ii<BURST LENGTH*4; ii++) {
    S_accum+=adc[ii]*sin_lut[((ii*increment+
        PHASE_OFFSET)%256)];
    C_accum+=adc[ii]*cos_lut[((ii*increment+
        PHASE_OFFSET)%256)]
}
S=(S_accum+32)>>6; /* Round down 6 bits */
C=(C_accum+32)>>6; /* Round down 6 bits */
```

In the above example code, adc[ii] for ii=[0 . . . BURST_LENGTH*4−1] may be the digitized samples from the ADC within the current demodulation window. In summary, the machine 410 may operate to determine a phase increment between each digitized sample adc[ii] by right shifting the value 256 by a burst frequency value plus two (e.g. increment=$2^8/2^{BURST\_FREQ+2}$). The burst frequency values may take values such as 0 for full-rate, 1 for half-rate, 2 for quarter-rate, and 3 for eight-rate bursts. The machine 410 may determine the phase index (p) 422 for each digitized sample adc[ii] as "((ii*increment+PHASE_OFFSET)%256)" for ii from 0 to ((BURST LENGTH*4)−1). The weight LUT 408, multiplier 402, and accumulator 404 may operate as described above using p 422 to determine S_accum and C_accum which may correspond to Acc 418 in FIG. 4. The rounding module 406 may determine the sine or cosine component by right shifting (Acc+32) six times (e.g. by dividing by $2^6$) to generate R 434.

It should be noted that some embodiments may not perform rounding or may round down to a different resolution. Further, the number of bits in the phase index may determine the resolution of the phase control. Embodiments are not limited to 8-bit resolution.

In some embodiments, the burst length 424 and burst frequency 426 may be received from another source (shown in FIG. 4) or may be set or determined at the time of manufacture and be permanent.

The phase of the burst demodulation can be controlled by the PHASE_OFFSET register value. As described in the above code fragment, this register value may offset the sine and cosine LUT indices (modulo 256), offsetting the phase of the weights by ($2\pi$*PHASE_OFFSET/256) radians. In effect, this may be equivalent to advancing the phase of the ADC samples by the phase offset. In the above example, the phase offset may be a phase delay and, when converted to sampling periods, may scale with the burst period. For example, for a full-rate (period=$4*T_{sample}$) burst, the effect may be equivalent to advancing the ADC sampling phase by $T_{sample}$*PHASE_OFFSET/64. For a half-rate (period=$8*T_{sample}$) burst, the effect may be equivalent to advancing the ADC sampling phase by twice that amount, namely, $T_{sample}$*PHASE_OFFSET/32, as the a phase interval indexed by PHASE_OFFSET may now correspond to a time interval of $8*T_{sample}$ (as compared to $4*T_{sample}$ for the full-rate case).

The phase offset ($\varphi$) may be determined based on a timing signal (e) 428, an adaptation step size signal ($\mu$) 430 and a number of solutions for adaptation signal (n) 432. An example embodiment for determining the phase offset ($\varphi$) is described below.

As mentioned above, the phase offset may adjust the phase of the sine and cosine demodulation relative to the ADC sampling phase, which may be driven by the servo timing acquisition. This phase offset value may be used to adjust for phase offsets between the servo preamble and servo PES bursts. Such phase offsets may, for example, be caused by a non-linear phase response (or equivalently non-constant group delay) from an analog continuous time filter (CTF).

Systems according to this disclosure may adapt the phase offset signal. The demodulation phase adaptation step size is controlled using adaptation step size signal ($\mu$) 430. The adaptation may be driven off the demodulated phase output, $Reg_\varphi$ 338. Stationary points (e.g. steady state solutions for $Reg_\varphi$) may be controlled by the number of solutions for adaptation signal (n) 432. In particular, the adaptation process may utilize $2^{(n+1)}$ solutions for $Reg_\varphi$ 338, which may be evenly spread across the range of $Reg_\varphi$ 338. For example, for a 16-bit $Reg_\varphi$ 338 value, setting n=1 may cause the phase offset to shift the phase such that the demodulated phase, $Reg_\varphi$ 338, on average, may settle at one of the [0, 16384, 32768, 49152], which correspond to phases of [0, $\pi/2$, $\pi$, $3\pi/2$]. These target phases may allow adaptation updates from both in-phase (sine) and out-of-phase (cosine) bursts to be applied to the loop in a consistent manner.

Figure 6:
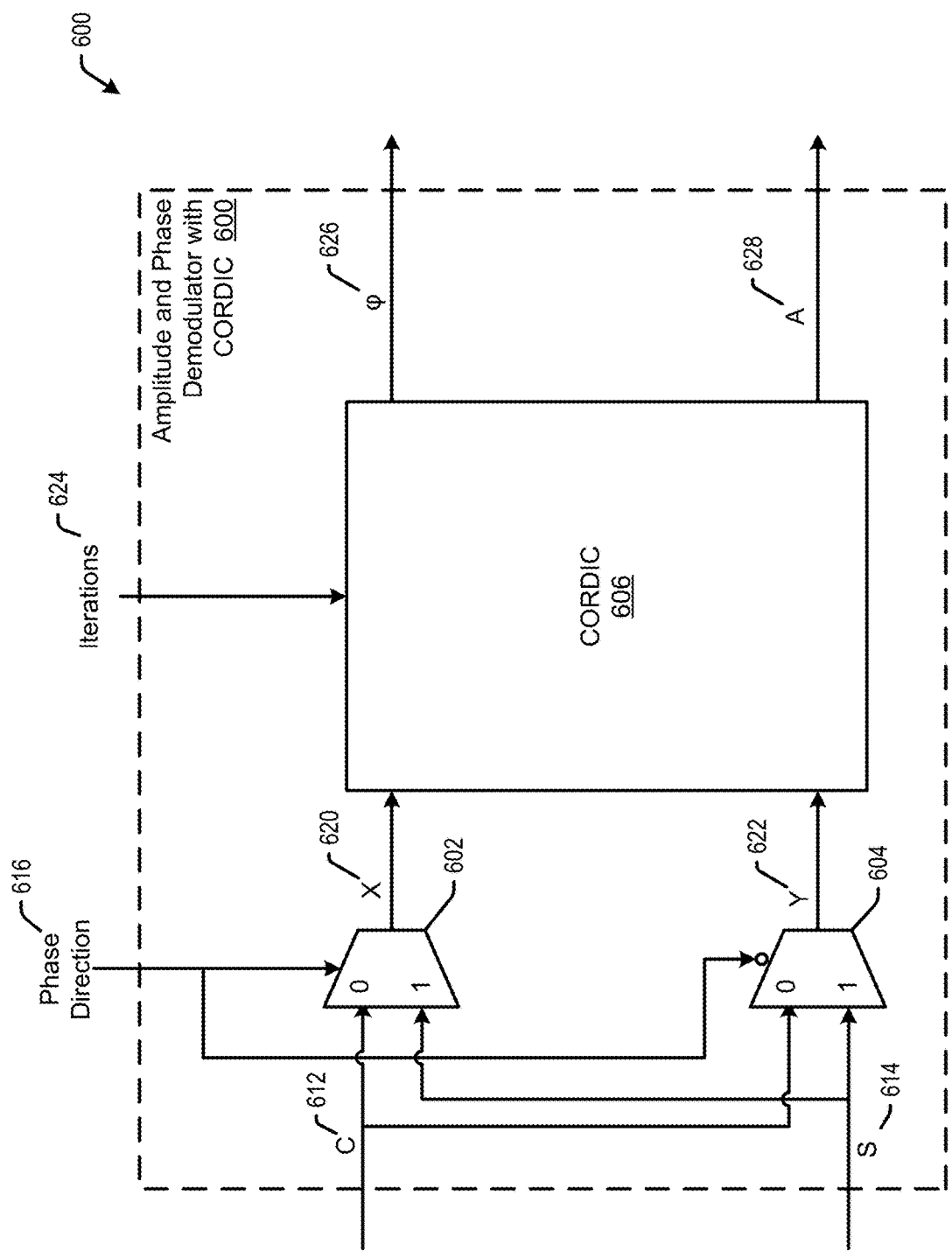
FIG. 6 is a block diagram of a portion of the architecture of a PES burst demodulator, in accordance with certain embodiments of the present disclosure.

Referring to FIG. 6, a block diagram 600 of an example embodiment of the amplitude and phase demodulator with a CORDIC 316 of the position error signal burst demodulation system of FIG. 3 is shown and is generally designated 600. The example embodiment of the amplitude and phase demodulator 600 can include two multiplexers 602 and 604 that may be coupled to a CORDIC (COordinate Rotation DIgital Computer) 606 which may in turn be coupled to the phase register 608 and amplitude register 610.

Figure 7A:
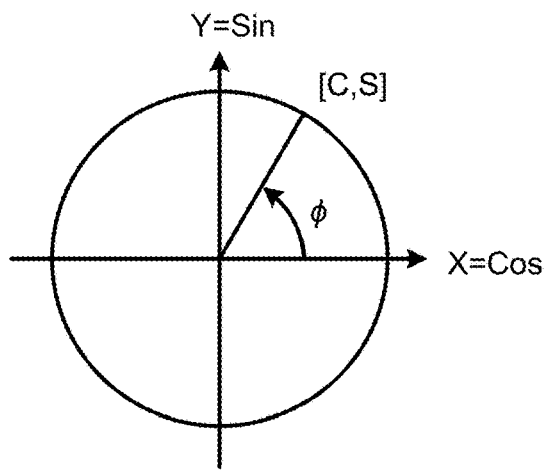
FIGS. 7A and 7B show a diagram illustrating the effect of the phase direction on the determination of the demodulated phase component, in accordance with certain embodiments of the present disclosure.
Figure 7B:
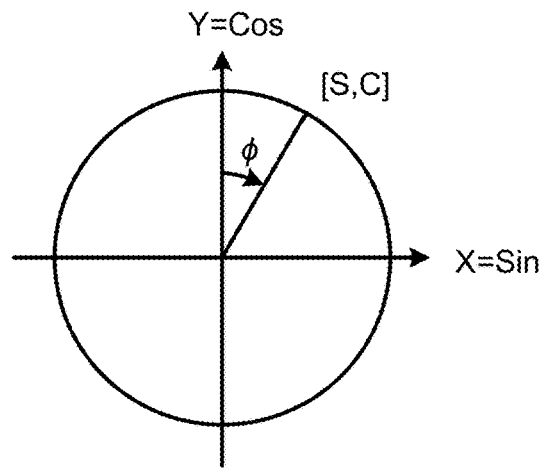

In operation, the two multiplexers 602 and 604 may each receive as input the cosine component value (C) 612, the sine component value (S) 614 and a phase direction value (PHASE_DIR) 616. For example, values 612 and 614 may be received from the cosine burst register 312 and the sine burst register 314 of the first stage and the phase direction value 616 may be received from another source (shown in FIG. 4) or may be determined within the second stage. FIGS. 7A and 7B show a diagram illustrating the effect of the phase direction value 616 on the determination of the demodulated phase component (e.g. demodulated phase value ($\varphi$) 334 of FIG. 3). As shown in FIGS. 7A and 7B, the phase direction value 616 may determine whether the X input 620 and Y input 622 to the CORDIC are [C 612, S 614] or [S 614, C 612]. In effect, the phase direction value 616 may reverse the direction of increasing phase $\phi$ and introduce a $\pi/2$ offset. In some implementations, the $\pi/2$ offset may be removed by increasing the phase offset ($\varphi$) by $3\pi/2$ radian. For example, in the above discussed system with an 8-bit phase value, the PHASE_OFFSET may be increased by 192.

Figure 8:
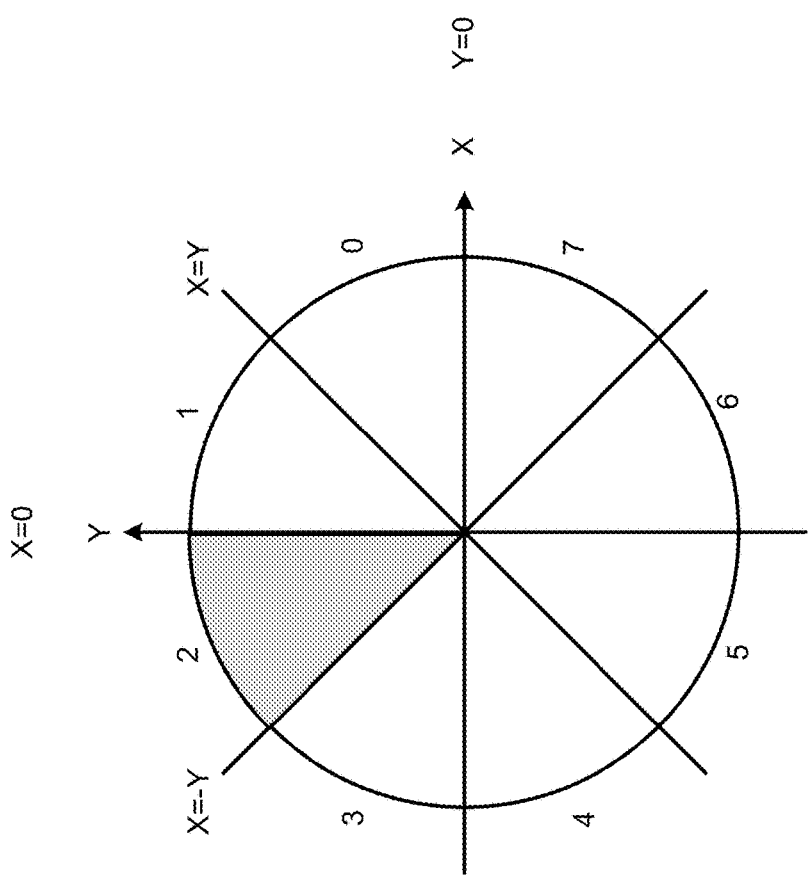
FIG. 8 is a diagram illustrating a set of octants, in accordance with certain embodiments of the present disclosure.

In operation, the CORDIC 606 may pre-process the [X 620, Y 622] vector to map the vector into a different octant. FIG. 8 is a diagram illustrating a set of octants defined by the boundary lines (X=0, Y=0, X=Y, X=−Y) using <= to include the lower phase bounding line in the octant region. The octant of the vector may be determined by matching conditionals with regard to two of the four boundary lines. For example, as depicted in FIG. 8, determining if (X<=0) & (Y>−X) may determine if the point [X, Y] is in octant 2 (shown in FIG. 6 with shading). Once the octant of the vector is determined, the CORDIC 606 may map the vector into the first octant and determine the rotation of the vector within the first octant. In some examples, a vector may be mapped to the first octant by taking the absolute value of X and Y.

The CORDIC 606 algorithm may iteratively rotate a vector to the x-axis, while summing the angular change. For example, the update may be an implementation of the following equation, where the assignment arrow indicates a concurrent update and n is the number of CORDIC iterations, $$\begin{aligned}
&\text{for} \quad i = 1 \dots n \\
&\quad Y \rightarrow Y - K \times X \\
&\quad X \rightarrow X + K \times Y \\
&\quad K = \begin{cases} 2^{-i}, & \text{if } Y \geq 0 \\ -2^{-i}, & \text{otherwise} \end{cases} \\
&\text{end}
\end{aligned}$$

The number of iterations may be received from another source as ITER 624 (as shown in FIG. 6) or may be set or determined at the time of manufacture and be permanent.

In some embodiments, in the transformation of the above equation, the amplitude change may depend on the iteration number (or abs(K)), and the rotation may depend on the decision K. Further, the magnitude (but not the sign) of K for each iteration may be known a-priori. In particular, the magnitude of the amplitude and phase may be determined as:

$$A\left(=\sqrt{S^2+C^2}\right) \rightarrow A \times \sqrt{(1+K^2)}$$
$$\phi \rightarrow \phi + \arctan K$$

The amplitude computed using the CORDIC algorithm may differ from the burst amplitude estimate, sqrt($S^2+C^2$), by a scale factor, $A_{scale}$ (e.g. without an additional scaling circuit). The amplitude scale factor may be given by the following equation.

$$A_{scale} = \prod_{i=1}^{Niter} \sqrt{1+2^{-2i}}$$

After six iterations, this scale factor may saturate to 1.1644. The CORDIC 606 may not account for this scale factor, as it may be constant for a fixed number of iterations. If the exact burst amplitude (in terms of ADC least significant bits) is desired, it may be computed using the following equation:

$$A_{ACTUAL} = \frac{A_{CORDIC}}{A_f \times REG\_BD\_BURST\_LENGTH \times 256}$$

Once the phase ϕ has been determined, the CORDIC 606 may recover the original octant using the determined phase ϕ as a rotation value. In particular, the original phase can be recovered by inverting the mapping into the first octant and applying the CORDIC rotation with the correct direction. This operation is described in the following code fragment:

```
# define PI_OVER_2 (1<<14)
if (Octant 0) P=rot;
if (Octant 1) P=(PI_OVER_2) -rot;
if (Octant 2) P=(PI_OVER_2) +rot;
if (Octant 3) P=(2*PI_OVER_2)-rot;
if (Octant 4) P=(2*PI_OVER_2)+rot;
if (Octant 5) P=(3*PI_OVER_2)-rot;
if (Octant 6) P=(3*PI_OVER_2)+rot;
if (Octant 7) P=(4*PI_OVER_2)-rot;
```

As shown above, in the recovery operation of some examples, because the absolute value operation that mapped the vector to the first octant may mirror the vector through the X/Y axis if a value is negative, the rotations for odd numbered octants may be subtracted. As such, the above code fragment may include a sign flip on the rotation when mapping the vector back to the original octant.

The recovered phase φ and the determined amplitude may then be output as the demodulated phase component (ϕ) 626 and the demodulated amplitude component (A) 628.

Figure 9:
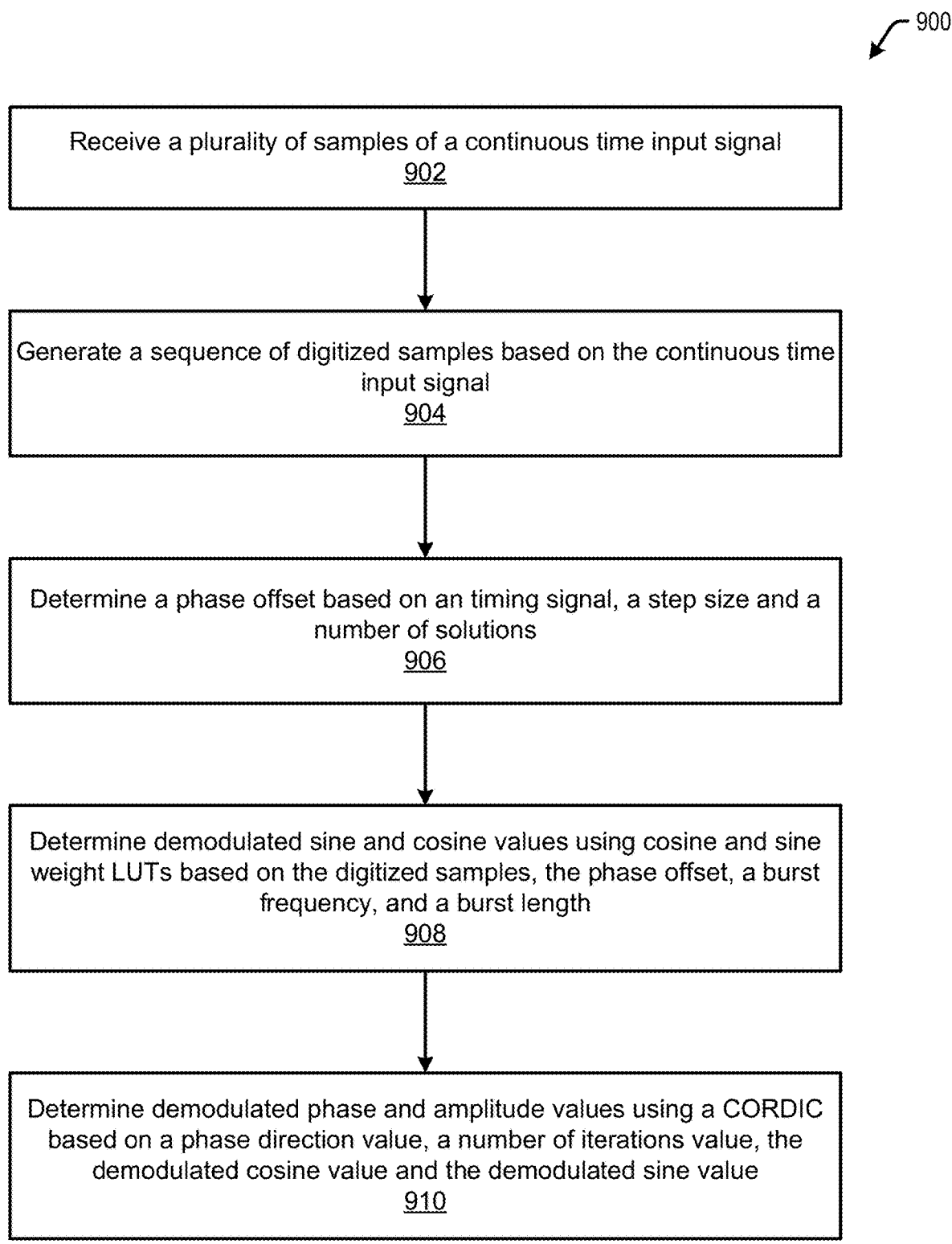
FIG. 9 is a flowchart of a method of PES burst demodulation, in accordance with certain embodiments of the present disclosure.

Referring to FIG. 9, a flowchart of a method for position error signal burst demodulation is shown and is generally designated 900. The method 900 can be an embodiment of the systems 100, 200, 300, 400 and 600. The operations of method 900 may be performed as detailed above with respect to FIGS. 1-8.

The system may receive a plurality of samples of a continuous time input signal at 902. The system may then generate a sequence of digitized samples based on the continuous time input signal at 904. The system may then determine a phase offset based on a timing signal, a step size and a number of solutions at 906. At 908, the system may determine demodulated sine and cosine values using cosine and sine weight LUTs based on the digitized samples, the phase offset, a burst frequency, and a burst length. At 910, the system may determine demodulated phase and amplitude values using a CORDIC based on a phase direction value, a number of iterations value, the demodulated cosine value and the demodulated sine value.

All steps listed for the method may 900 be applied to systems that utilize position error signals. Many variations would be apparent in view of this disclosure. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 10:
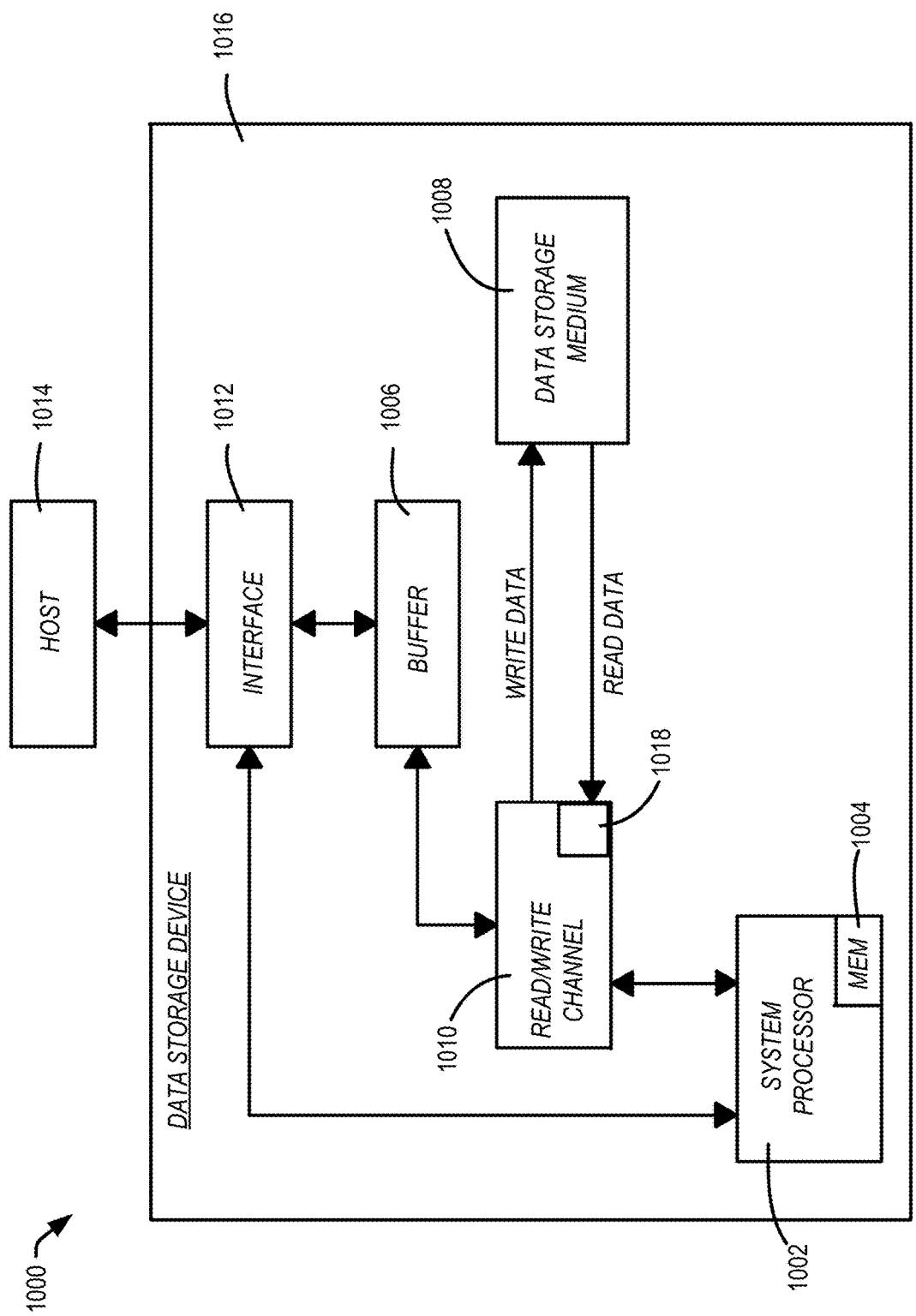
FIG. 10 is a block diagram of a system that uses PES burst demodulation, in accordance with certain embodiments of the present disclosure.

Referring to FIG. 10, a block diagram of a system including position error signal burst demodulation is shown and generally designated 1000. The system 1000 can be an example of a data storage device (DSD), and may be an example implementation of systems 100, 200, 300, 400 or 600. The DSD 1016 can optionally connect to and be removable from a host device 1014, which can be a device or system having stored data, such as a desktop computer, a laptop computer, a server, a digital video recorder, a photocopier, a telephone, a music player, other electronic devices or systems not listed, or any combination thereof. The data storage device 1016 can communicate with the host device 1014 via the hardware/firmware based host interface circuit 1012 that may include a connector (not shown) that allows the DSD 1016 to be physically connected and disconnected from the host 1014.

The DSD 1016 can include a system processor 1002, which may be a programmable controller, and associated memory 1004. The system processor 1002 may be part of a system on chip (SOC). A buffer 1006 may temporarily store data during read and write operations and can include a command queue. The read/write (R/W) channel 1010 can encode data during write operations to, and reconstruct data during read operations from, the data storage medium 1008. The data storage medium 1008 is shown and described as a hard disc drive, but may be other types of magnetic medium, such as a flash medium, optical medium, or other medium, or any combination thereof.

The R/W channel 1010 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel 1010 can combine multiple inputs and provide a single output, as described in examples herein.

The block 1018 can implement all of or part of the systems and functionality of systems and methods 100, 200, 400 and 900. In some embodiments, the block 1018 may be a separate circuit, integrated into the R/W channel 1010, included in a system on chip, firmware, software, or any combination thereof. Further, in some embodiments, some or all of the functionality of block 1018 may be a portion of a servo system (not shown).

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit having a CORDIC (Coordinate Rotation Digital Computer), the circuit configured to:
   receive a plurality of samples of a continuous time input signal corresponding to a servo burst window of a position error signal;
   generate a sequence of digitized samples of the servo burst window of the position error signal based on the continuous time input signal;
   determine a phase offset based on a timing signal, a step size and a number of solutions;
   determine demodulated sine and cosine values using cosine and sine weight LUTs based on the digitized samples, the phase offset, a burst frequency, and a burst length component based at least in part on the digitized samples;
   generate a demodulated phase component signal and a demodulated amplitude component signal based on a based on a phase direction value, a number of iterations value, the demodulated cosine value and the demodulated sine value using the CORDIC; and
   the circuit having one or more outputs to provide the demodulated phase component signal and the demodulated amplitude component signal to a servo control system.

2. The apparatus of claim 1, further comprising the circuit further configured to:
   perform the generating of the demodulated phase component signal and the demodulated amplitude component signal using the CORDIC at least in part by iteratively rotating a vector and determining an angular change in the rotated vector.

3. The apparatus of claim 2, further comprising:
   the vector being based on a demodulated sine component and a demodulated cosine component of the servo burst window of the position error signal.

4. The apparatus of claim 3, further comprising the circuit further configured to:
   generate the demodulated sine component using a sine weight look up table; and
   generate the demodulated cosine component using a cosine weight look up table.

5. The apparatus of claim 4 further comprising the circuit further configured to:
   perform the generating of the demodulated sine component and the demodulated cosine component based at least in part on a phase offset, a burst frequency, and a burst length.

6. The apparatus of claim 5, further comprising the circuit configured to:
   select a sine weight from the sine weight look up table using an index representing phases, the phase offset being used to offset the index value.

7. The apparatus of claim 4, further comprising the circuit configured to:
   multiply each sample of the servo burst window with a respective sine weight output from the sine weight look up table to generate a plurality of multiplication results; and
   accumulate a sum of the plurality of multiplication results.

8. The apparatus of claim 1 further comprising a servo control system coupled to the circuit and configured to control a servo positioning based on the demodulated phase component signal and the demodulated amplitude component signal.

9. A control system comprising:
   a sine demodulation circuit configured to:
   generate a demodulated sine component using a sine weight look up table;
   a cosine demodulation circuit configured to:
   generate a demodulated cosine component using a cosine weight look up table; and
   a phase and amplitude demodulator circuit including a CORDIC (Coordinate Rotation Digital Computer) configured to:
   generate a demodulated phase component signal and a demodulated amplitude component signal based on the demodulated sine component and the demodulated cosine component; and
   a servo control system configured to control a servo positioning based on the demodulated phase component signal and the demodulated amplitude component signal.

10. The control system of claim 9 further comprising:
    the cosine demodulation circuit configured to generate the demodulated cosine component at least in part by:
    multiplying each sample of a sequence of digitized samples of a servo burst window of a position error signal with a respective cosine weight output from the cosine weight look up table to generate a plurality of multiplication results; and
    accumulating a sum of the plurality of multiplication results.

11. The control system of claim 10 further comprising:
    an analog to digital converter configured to:
    receive a plurality of samples of a continuous time input signal corresponding to the servo burst window of the position error signal; and
    generate the samples of the sequence of digitized samples of the servo burst window of the position error signal based on the continuous time input signal.

12. The control system of claim 11 further comprising the sine demodulation circuit configured to:
    determine the demodulated cosine component based at least in part on a phase offset, a burst frequency, and a burst length.

13. The control system of claim 12 further comprising the sine demodulation circuit configured to:
    select a cosine weight from the cosine weight look up table using an index representing phases, the phase offset being used to offset the index value.

14. The control system of claim 9 further comprising the phase and amplitude demodulator configured to:

perform the generating of the demodulated phase component signal using the CORDIC at least in part by:
  iteratively rotating a vector based on the demodulated sine component and the demodulated cosine component; and
  determining an angular changes in the vector.

15. A method comprising:
generating a demodulated sine component for a sequence of samples of a servo burst window of a position error signal using a sine weight look up table;
generating a demodulated cosine component for the sequence of samples of the servo burst window of the position error signal using a cosine weight look up table, the sine weight look up table and the cosine weight look up table having indexes representing a phase range; and
generating a demodulated phase component signal and a demodulated amplitude component signal for the sequence of samples of the servo burst window of the position error signal based on the demodulated sine component and the demodulated cosine component using a CORDIC (COordinate Rotation DIgital Computer) at least in part by:
  iteratively rotating a vector based on the demodulated sine component and the demodulated cosine component; and
  determining an angular change in the vector resulting from the iterative rotating of the vector.

16. The method of claim 15, the generating the demodulated cosine component comprising:
  multiplying each sample of the sequence of samples of the servo burst window of the position error signal with a respective cosine weight output from the cosine weight look up table to generate a plurality of multiplication results; and
  accumulating a sum of the plurality of multiplication results.

17. The method of claim 16 further comprising:
receiving a plurality of samples of a continuous time input signal corresponding to the servo burst window of the position error signal; and
generating the samples of the sequence of samples of the servo burst window of the position error signal based on the continuous time input signal.

18. The method of claim 15 further comprising:
determining the demodulated cosine component based at least in part on a phase offset at least in part by selecting a cosine weight for each sample of the sequence of the samples of the servo burst window from the cosine weight look up table using the phase offset to offset the index value.

* * * * *